(12) United States Patent
Claxton

(10) Patent No.: US 8,370,031 B2
(45) Date of Patent: Feb. 5, 2013

(54) DEVICE FOR MEASURING A LOAD AT THE END OF A ROPE WRAPPED OVER A ROD

(75) Inventor: Richard L. Claxton, Whitefish Bay, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 0 days.

(21) Appl. No.: 13/471,985

(22) Filed: May 15, 2012

(65) Prior Publication Data

US 2012/0290147 A1 Nov. 15, 2012

Related U.S. Application Data

(60) Continuation of application No. 12/558,533, filed on Sep. 13, 2009, now Pat. No. 8,209,096, which is a division of application No. 11/437,308, filed on May 19, 2006, now abandoned.

(51) Int. Cl.
*G06F 19/00* (2006.01)
*G06G 7/00* (2006.01)
(52) U.S. Cl. ............ 701/50; 702/42; 177/135; 177/141; 177/147; 73/862.391
(58) Field of Classification Search .................. 701/50; 177/135, 141; 702/42; 73/862.391, 862.473
See application file for complete search history.

(56) References Cited

U.S. PATENT DOCUMENTS

| | | | | |
|---|---|---|---|---|
| 3,695,096 A | * | 10/1972 | Kutsay | 73/761 |
| 4,532,595 A | * | 7/1985 | Wilhelm | 701/124 |
| 4,583,907 A | * | 4/1986 | Wimberley | 414/718 |
| 4,677,579 A | * | 6/1987 | Radomilovich | 702/174 |
| 5,160,056 A | * | 11/1992 | Yoshimatsu et al. | 212/277 |
| 5,490,081 A | * | 2/1996 | Kuromoto et al. | 700/178 |
| 5,646,844 A | * | 7/1997 | Gudat et al. | 701/409 |
| 5,704,141 A | * | 1/1998 | Miura et al. | 37/348 |
| 6,047,475 A | * | 4/2000 | Tyrrell et al. | 30/134 |
| 6,225,574 B1 | * | 5/2001 | Chang et al. | 177/139 |

(Continued)

FOREIGN PATENT DOCUMENTS

| | | | |
|---|---|---|---|
| JP | 1-251250 | * | 9/1989 |
| JP | 1-251240 | | 10/1989 |

(Continued)

OTHER PUBLICATIONS

A model-based vision system for manipulator position sensing; Mulligan, I.J.; Mackworth, A.K.; Lawrence, P.D.; Interpretation of 3D Scenes, 1989. Proceedings., Workshop on; Digital Object Identifier: 10.1109/TDSCEN.1989.68118; Publication Year: 1989 , pp. 186-193.*

(Continued)

Primary Examiner — Cuong H Nguyen
(74) Attorney, Agent, or Firm — Michael Best & Friedrich LLP

(57) ABSTRACT

A digging machine. The machine includes a rod having a central bore with at least two strain gauges angled relative to each other, a hoist rope, and a CPU configured to create a calibration table of a plurality of outputs from each of the two strain gauges, given various rope tensions and rope angles, determine an unknown rope tension and rope angle, use the output from one strain gauge and create a first set of data point angle and tension pairs from plurality of calibration outputs that correspond to the one output from one strain gauge, use the output from the other strain gauge and create a second set of data point angle and tension pairs from the plurality of calibration outputs that correspond to the one output from other strain gauge, and determine, based on where said two sets of data points intersect, rope tension and rope angle.

8 Claims, 6 Drawing Sheets

U.S. PATENT DOCUMENTS

| | | | | |
|---|---|---|---|---|
| 6,377,210 | B1 * | 4/2002 | Moore | 342/357.4 |
| 6,611,738 | B2 * | 8/2003 | Ruffner | 701/23 |
| 6,711,838 | B2 * | 3/2004 | Staub et al. | 37/348 |
| 6,768,944 | B2 * | 7/2004 | Breed et al. | 701/301 |
| 6,813,499 | B2 * | 11/2004 | McDonnell et al. | 455/456.1 |
| 6,862,526 | B2 * | 3/2005 | Robbins | 701/469 |
| 6,882,307 | B1 * | 4/2005 | Gifford | 342/357.25 |
| 6,934,616 | B2 * | 8/2005 | Colburn et al. | 701/50 |
| 7,178,606 | B2 * | 2/2007 | Pecchio | 172/6 |
| 7,441,464 | B2 * | 10/2008 | Turnbull et al. | 73/779 |
| 7,734,397 | B2 * | 6/2010 | Peterson et al. | 701/50 |
| 2003/0097885 | A1 * | 5/2003 | Kell | 73/862 |
| 2005/0134367 | A1 * | 6/2005 | Johnson et al. | 327/545 |
| 2006/0136110 | A1 * | 6/2006 | Casey et al. | 701/50 |
| 2006/0137476 | A1 * | 6/2006 | Bull et al. | 73/862.393 |

FOREIGN PATENT DOCUMENTS

| | | | |
|---|---|---|---|
| JP | 2-77258 | * | 3/1990 |
| JP | 4-150125 | * | 5/1992 |
| JP | 4-297511 | | 10/1992 |
| JP | 4-297511 | * | 11/1992 |

OTHER PUBLICATIONS

Modeling and simulation of folding-boom aerial platform vehicle based on the flexible multi-body dynamics; Haidong Hu; En Li; Xiaoguang Zhao; Zize Liang; Wensheng Yu; Intelligent Control and Information Processing (ICICIP), 2010 Inter. Conf. on; Digital Object Identifier: 10.1109/ICICIP.2010.5565257; Pub. Yr: 2010 , pp. 798-802.*

Command shaping and closed-loop control interactions for a ship crane; Agostini, M.; Parker, G.G.; Groom, K.; Schaub, H.; Robinett, R.D.; American Control Conference, 2002. Proceedings of the 2002; vol. 3; Digital Object Identifier: 10.1109/ACC.2002.1023983; Publication Year: 2002 , pp. 2298-2304 vol. 3.*

Development of the Operation Support System for a Rotary Crane Considering the Collision Avoidance to the Ground and the Suppression a Swing of Transfer Object; Kaneshige, A.; Terashima, K.; SICE-ICASE, 2006. International Joint Conference Digital Object Identifier: 10.1109/SICE.2006.315760; Publication Year: 2006 , pp. 1530-1533.*

Safety Monitoring Method of Hoisting Equipment Based on Pressure Measuring; Zhou Zhaofa; Li Feng; Huang Xianxiang; Electronic Measurement and Instruments, 2007. ICEMI '07. 8th International Conference on; Digital Object Identifier: 10.1109/ICEMI.2007. 4350727; Publication Year: 2007 , pp. 2-504-2-507.*

Stereo vision based swing angle sensor for mining rope shovel; Li-Heng Lin; Lawrence, P.D.; Hall, R.; Intelligent Robots and Systems (IROS), 2010 IEEE/RSJ International Conference on; Digital Object Identifier: 10.1109/IROS.2010.5650457 Publication Year: 2010 , pp. 1714-1721.*

Anti-sway control for boom cranes; Sawodny, O.; Aschemann, H.; Kumpel, J.; Tarin, C.; Schneider, K.; American Control Conference, 2002. Proceedings of the 2002; vol. 1; Digital Object Identifier: 10.1109/ACC.2002.1024811 Publication Year: 2002 , pp. 244-249 vol. 1.*

Observer design for boom cranes with double-pendulum effect ; Neupert, J.; Heinze, T.; Sawodny, O.; Schneider, K.; Control Applications, (CCA) & Intelligent Control, (ISIC), 2009 IEEE; Digital Object Identifier: 10.1109/CCA.2009.5281042 Publication Year: 2009 , pp. 1545-1550.*

A model-based vision system for manipulator position sensing; Mulligan, I.J.; Mackworth, A.K.; Lawrence, P.D.; Interpretation of 3D Scenes, 1989. Proceedings., Workshop on; Digital Object Identifier: 10.1109/DSCEN.1989.68118; Publication Year: 1989, pp. 186-193.

Modeling and simulation of folding-boom aerial platform vehicle based on the flexible multi-body dynamics; Haidang Hu; En Li; Xiaoguang Zhao; Zize Liang; Wensheng Yu; Intelligent Control and Information Processing (ICICIP), 2010 Inter. Conf. on; Digital Object Identifier: 10.1109/ICICIP.2010.5565257; Pub. Yr: 2010, pp. 798-802.

Development of the Operation Support System for a Rotary Crane Considering the Collision Avoidance to the Ground and the Suppression a Swing of Transfer Object; Kaneshige, A.; Terashima, K.; SICE-ICASE, 2006. International Joint Conference Digital Object Identifier: 10.1109/SICE.2006.315760; Publication Year: 2006 , pp. 1530-1533.

Safety Monitoring Method of Hoisting Equipment Based on Pressure Measuring; Zhou Zhaofa; Li Feng; Huang Xianxiang; Electronic Measurement and Instruments, 2007. ICEMI '07. 8th International Conference on; Digital Object Identifier: 10.1109/ICEMI.2007. 4350727; Publication Year: 2007, pp. 2-504-2-507.

Stereovision based swing angle sensor for mining rope shovel; Li-Heng Lin; Lawrence, P.D.; Hall, R.; Intelligent Robots and Systems (IROS), 2010 IEEE/RSJ International Conference on; Digital Object Identifier: 10.1109/1ROS.2010.5650457 Publication Year: 2010, pp. 1714-1721.

Anti-sway control for boom cranes; Sawodny, O.; Aschemann, H.; Kumpel, J.; Tarin, C.; Schneider, K.; American Control Conference, 2002. Proceedings of the 2002; vol. 1; Digital Object Identifier: 10.1109/ACC.2002.1024811 Publication Year: 2002, pp. 244-249 vol. 1.

Observer design for boom cranes with double-pendulum effect; Neupert, J.; Heinze, T.; Sawodny, O.; Schneider, K.; Control Applications, (CCA) & Intelligent Control, (ISIC), 2009 IEEE; Digital Object Identifier: 10.1109/CCA.2009.5281042 Publication Year: 2009, pp. 1545-1550.

Notice of Allowance from the United States Patent and Trademark Office for U.S. Appl. No. 12/558,533 dated Nov. 7, 2011 (10 pages).

Notice of Allowance from the United States Patent and Trademark Office for U.S. Appl. No. 12/558,533 dated Feb. 22, 2012 (8 pages).

Notice of Allowance from the United States Patent and Trademark Office for U.S. Appl. No. 12/588,532 dated May 26, 2011 (9 pages).

Office Action from the United States Patent and Trademark Office for U.S. Appl. No. 11/437,308 dated Mar. 17, 2009 (9 pages).

* cited by examiner

DEVICE FOR MEASURING A LOAD AT THE END OF A ROPE WRAPPED OVER A ROD

This Application is a continuation of U.S. application Ser. No. 12/558,533, filed on Sep. 13, 2009, which is a Division of U.S. application Ser. No. 11/437,308, filed on May 19, 2006, now abandoned. This Application is also related to U.S. application Ser. No. 12/558,532, filed on Sep. 13, 2009, now U.S. Pat. No. 8,032,313, which is a Division of U.S. application Ser. No. 11/437,308, filed on May 19, 2006, now abandoned

BACKGROUND OF THE INVENTION

This invention is directed to devices for measuring the weight of a load at the end of a rope wrapped over a rod.

It is known to measure the weight of a load at the end of a rope wrapped or trained over a rod by using four strain gauges configured as a bridge circuit glued inside a central bore 3 in a rod 4. This is an optimum configuration to measure a force applied in a vertical direction only. When the force to be measured has a constant angle relative to the strain gauge, one set of gauges has been used.

The calibration procedure used in this instance is as follows.

1. Place the instrumented rod in a calibration fixture that applies a load in the vertical direction.
2. Apply an increasing load in a series of load steps. The maximum load is the expected maximum load the sensor will see. Measure the strain gauge bridge output at each of these load steps.
3. Repeat step 2 for decreasing load steps to zero load.
4. A curve is then fitted to this data, for example, a simple linear curve y=mx+b. Then for any given x, the output y can be calculated. If the slope m has units of pounds/mV and assuming b=0 lbs., then we can directly relate the output of the bridge circuit to the applied load P. A linear fit is known to give an overall accuracy of 1% full scale.

It is also known to use two strain gauge bridge circuits disposed to intersect each other at right angles to measure tensile or compressive strains in biaxial directions. This is known as a bi-axial load-sensing element.

SUMMARY OF THE INVENTION

It has been difficult to accurately calibrate strain gauges for a resultant force P with a non-stationary point of application. If the angle of this force changes with a change in rope wrap angle, i.e., if the rope pull can be from different directions, two sets of gauges oriented perpendicular to each other are needed.

The invention eliminates these inaccuracies. This invention provides a machine for raising and lowering a load, the machine including a platform, a boom attached at one end to the platform, and a rod mounted transverse to the longitudinal axis of the boom on the other end of a boom. The rod has a central bore there through, with at least two strain gauges mounted therein and angled relative to each other, a hoist rope extending over the rod and having an end adapted to be attached to the load, and a mechanism connected to the at least two strain gauges for determining the angle of departure of the hoist rope from the rod and the amount of pull of the load on the hoist rope.

The object of this invention is to provide a relatively accurate device for measuring the weight of a load at the end of a rope wrapped over a rod, where the direction of rope pull caused by the load relative to the rod is variable.

It is still another advantage of this invention to provide a measuring system of the foregoing type which can determine such calculations in a dynamic state and with an accuracy of within + or −0.1%.

It is another object of this invention to provide an improved system for measuring the load weight of large mining and lifting machinery, which system eliminates the need to try to compute dynamic force effects on the machine in order to get an accurate weight measurement.

It is yet another advantage of the present invention to provide a measuring system of the foregoing type which is adaptable for use with a wide variety of mining and lifting machinery.

It is yet another advantage of the present invention to provide a device that can automatically calibrate equipment, so the device accurately determines the location of a load carried by a mining and lifting machinery.

BRIEF DESCRIPTIONS OF THE DRAWINGS

Figure 1:
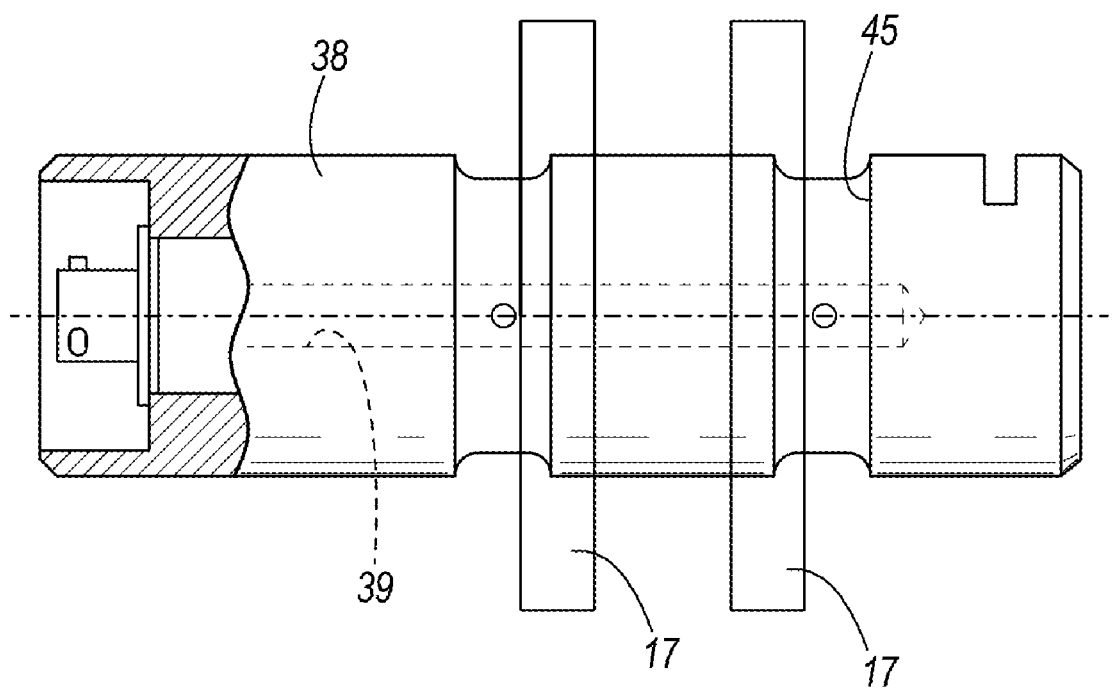
FIG. 1 is a partial broken away side view of a pin with a rifle bore with strain gauges mounted in the bore.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

DESCRIPTION OF THE PREFERRED EMBODIMENTS

As described below and as illustrated in the drawings, the invention is a machine for raising and lowering a load, such as a hoisting machine 8 including a device 22 supported from a structure. More particularly, the machine can be a piece of large mining machine or an industrial crane, or any device for lifting a load. In this detailed description, a power shovel is described, and the device 22 for holding the material to be lifted is a dipper.

Figure 2:
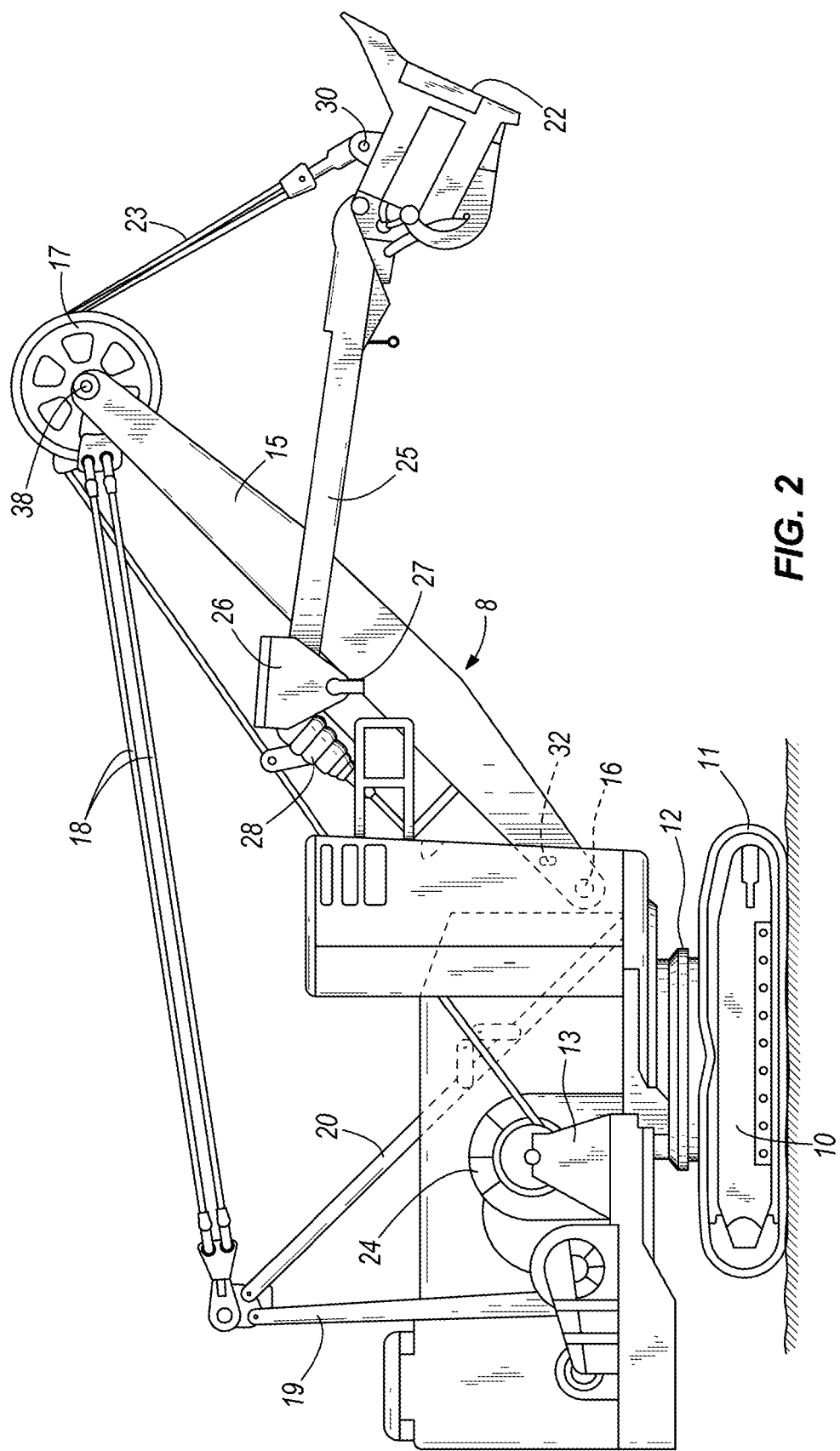
FIG. 2 is a plan view of a surface mining shovel that employs the mechanism of the present invention.

The power shovel 8 of FIG. 2 is of a well-known construction commonly referred to as an electric rope shovel. The shovel 8 comprises a mobile base 10 supported on drive tracks 11, and having supported thereon through a turntable 12, a platform in the form of a machinery deck 13. The turntable 12 permits full 360 degrees of rotation of the machinery deck relative to the base. A boom 15 is pivotally connected at a lower end 16 to the machinery deck 13. The boom 15 is held in a upwardly and outwardly extending relation to the deck by a brace in the form of tension cables 18 which are anchored to a back stay 19 of a stay structure 20 rigidly mounted on the machinery deck 13. A sheave 17 is rotatably mounted on the upper end of the boom 15.

The dipper 22 is suspended from the boom 15 by a hoist rope 23 wrapped over the sheave 17 and attached to the dipper 22 at a bail pin 30. The machine structure is movable to locate the dipper 22 in respective loaded and unloading positions. And the hoist rope is anchored to a winch drum 24 mounted on the machinery deck 13. As the winch drum rotates, the hoist rope 23 is either paid out or pulled in, lowering or raising the dipper 22. The dipper has an arm (also known as a handle) 25 rigidly attached thereto, with the dipper arm 25 slidably supported in a saddle block 26, which is pivotally mounted on the boom 15 at 27. The dipper arm has a rack tooth formation thereon (not shown) which engages a drive pinion (not shown) mounted in the saddle block 26. The drive pinion is driven by an electric motor and transmission unit 28 to effect extension or refraction of the dipper arm 25 relative to the saddle block 26.

A source of electrical power (not shown) is mounted on the machinery deck 13 to provide power to one or more hoist electric motors (not shown) that drives the winch drum 24, a crowd electric motor (not shown) that drives the saddle block transmission unit 28, and a swing electric motor (not shown) that turns the machinery deck turntable 12. The above-described basic construction of the shovel loader is widely known and used and further details of the construction are not provided, as they are well known in the art.

Each of the crowd, hoist, and swing motors is driven by its own motor controller (not shown) which responds to operator commands to generate the required voltages and currents in well known fashion.

More particularly, as shown in FIG. 1, the sheave 17 is mounted on a steel sheave rod 38. More particularly (not shown), there are two hoist ropes and two spaced apart sheaves mounted on the sheave rod 38. As shown in FIG. 1, each of the spaced apart sheaves 17 is positioned inside of grooves 45 in the sheave rod 38, with a portion of each sheave overlapping each groove. The pull of the hoist rope 23 is generally equally divided between the sheaves, so, i.e., if there are two sheaves one half of the rope pull is experienced by each sheave. In other embodiments (not shown), only a single hoist rope and sheave can be used. Hereinafter, any reference to a hoist rope or a sheave is also intended to include 2 or more hoist ropes and sheaves.

Figure 3A:
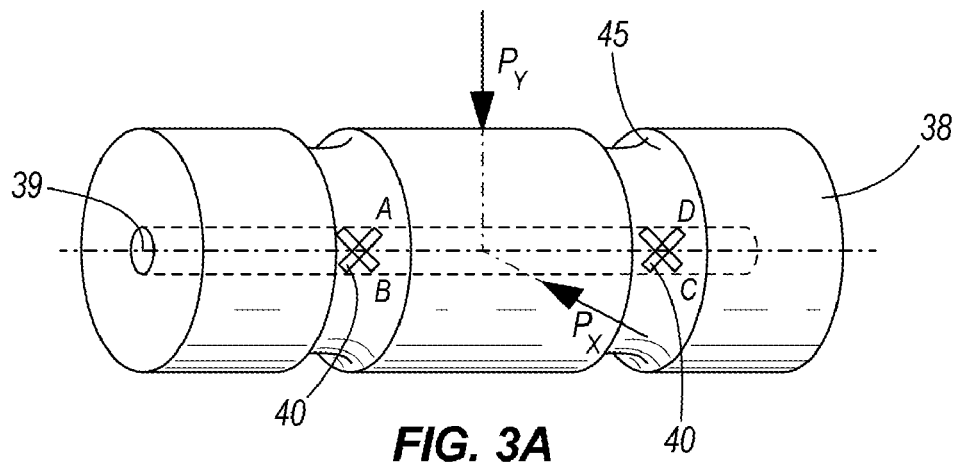
FIGS. 3A, 3B and 3C are a perspective view of the sheave rod of this invention, with a cross section showing the placement of the two sets of strain gauges and the resulting strain gauge bridge and the mechanism of this invention.
Figure 3B:
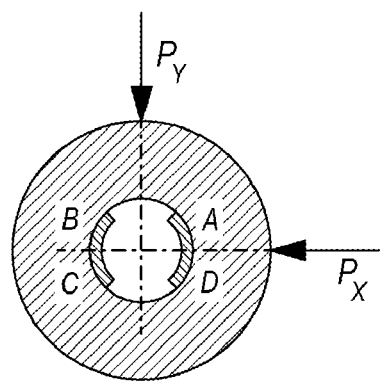
Figure 3C:
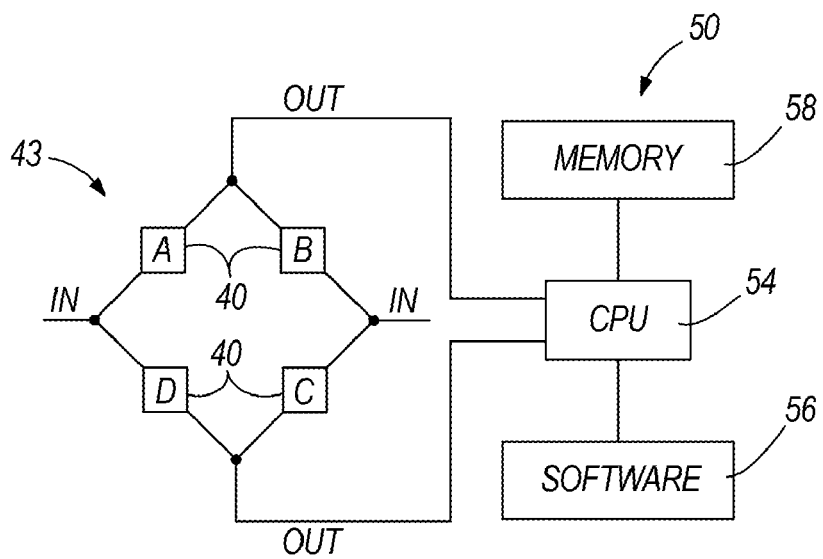

As shown in FIGS. 1 and 3, the sheave rod 38 has a central rifle drilled bore 39, and two sets of two strain gauges 40 each, as shown in FIG. 3, are glued inside the bore 39. Each set of strain gauges is mounted adjacent one of the sheaves, and is responsive to the rope pull or tension seen by the sheaves, which in turn deflect the sheave rod. The output of the two sets of strain gauges is combined through a bridge circuit 43 to get the output used for weight measurement. An example of the bridge circuit for measuring forces in an X direction is shown in FIG. 3. One half of the bridge circuit is located under each sheave.

In a similar fashion, a second bridge circuit (see FIG. 4) for measuring forces in the Y direction is located in the same manner inside the bore 39, only offset 90 degrees from the strain gauges of the first bridge circuit. The output from these bridge circuits of the instrumented sheave rod is used to determine the total applied force, as explained below.

Figure 4:
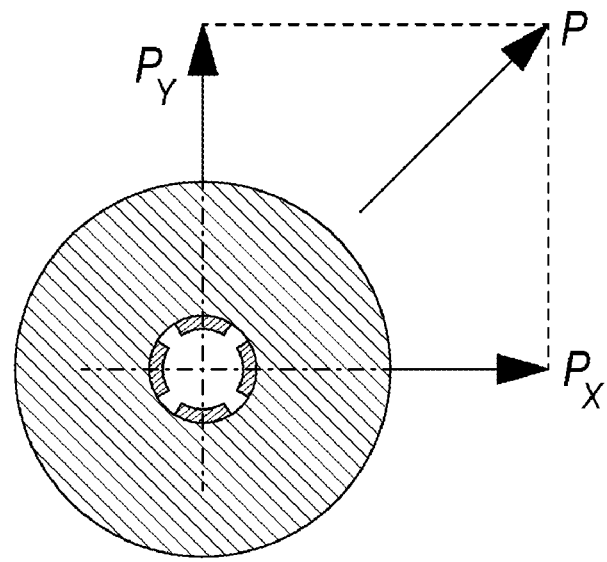
FIG. 4 is a cross section of the sheave pin with arrows showing how to determine the pull of a rope given the strain gauge outputs.
Figure 5:
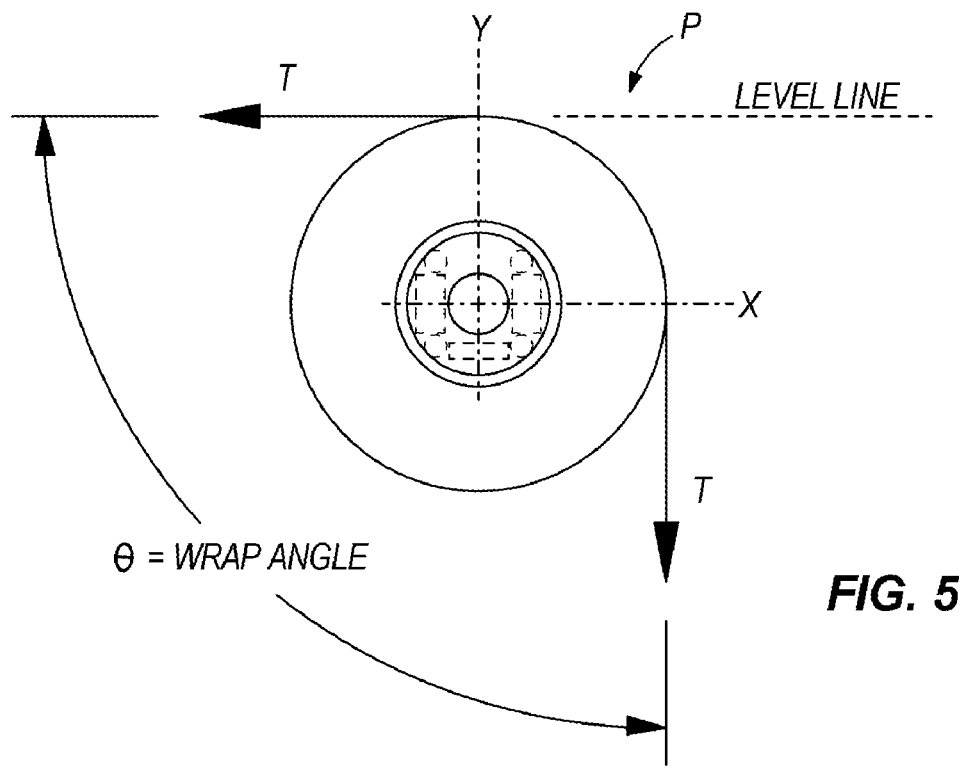
FIG. 5 is a cross section of the sheave pin and sheave with arrows showing how to determine the tension and angle of the rope wrapped over the sheave on the sheave pin.

As shown in FIG. 4, the cross section of the bi-axial sheave pin 38 illustrates the gauge alignment. The gauges marked Y sense load component Py, while the gauges marked X sense load in the Px direction. Given the voltage outputs form the two bridges as Ex and Ey, and constants Kx and Ky derived from calibration data, as hereinafter explained, the resultant force P is determined by Px=Kx*Ex and Py=Ky*Ey and the resultant Force P equals the square root of the same of the squares of Px and Py. As shown in FIG. 5, the line tension T and wrap angle Θ can be determined by T equaling the sum of $Px^2$ and $Py^2$ divided by 2Px, and Θ equal to $2\cos^{-1}$ P divided by 2T.

The power shovel 8 also includes means in the form of a strain gauge reading mechanism 50 connected to the two sets of strain gauges 40 for determining the angle of departure of the hoist rope 23 from the sheave rod 38 and the amount of pull of the load on the hoist rope 23, the mechanism 50 being, as shown schematically in FIG. 3, in the form of a central processing unit 54 including software 56 and memory 58, the memory including strain gauge calibration information. The mechanism 50 uses a method of determining the tension or force and angle of the hoist rope 23 wrapped over the sheave rod 38. The method comprises the following steps. First, of creating a calibration table of a plurality of outputs from each of the at least two strain gauge bridge sets, given various rope tensions and rope angles. Then second, when encountering an unknown rope tension and rope angle, taking the output from one strain gauge set and creating a set of data point angle and tension pairs from the plurality of calibration outputs that correspond to the one output from the one strain gauge set, and taking the output from the other strain gauge set and creating a set of data point angle and tension pairs from the plurality of calibration outputs that correspond to the one output from the other strain gauge set. Lastly, then determining, based on where the two sets of data points intersect, the rope tension and rope angle.

For a given output from the strain gauges, an amount of pull and direction of pull can be determined to within a + or − accuracy of 0.1%, as further described below.

In other words, the calibration information is a calibration table of a plurality of outputs from each of the at least two strain gauges, given the various rope tensions and rope angles. And the sets of data point angle and tension pairs is created from a curve fitted to the created strain gauge outputs. It is then determined where the two sets of data points intersect. This point is then put back into either of the date sets to determine the rope tension and rope angle.

For a large electric shovel, for example, the resultant tension or force P and angle of application of this force on the sheave rod will lie between 34 degrees (max extension and hoist), and 60 degrees (tuck) clockwise from the y-axis of the sheave rod, given the structure of the boom, arm, and dipper.

As an example, a total of 14 calibration curves were obtained for a sequence of calibration loads applied between 34 and 60 degrees in increments of 2 degrees. More particularly, a sequence of calibration loads was applied at an angle of 36 degrees. At each load increment, the corresponding voltage output from the x-axis and y-axis bridges was recorded. A fifth order curve fit was then determined for the Y and X axis data. The sheave rod was then rotated 2 degrees, and another calibration loading was applied, and so on.

Figure 6:
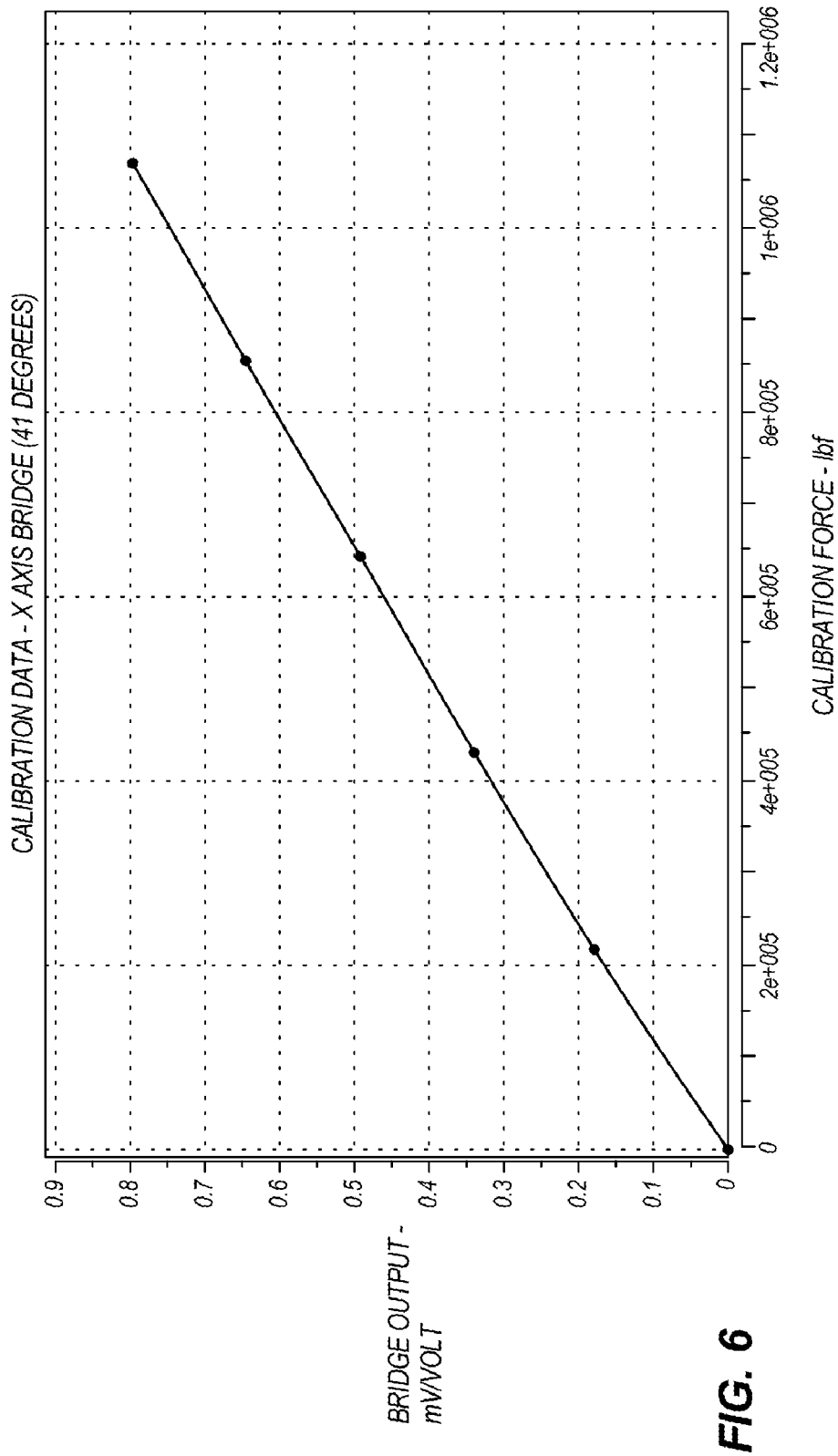
FIG. 6 is a graph of the sheave pin calibration data.

The fifth order curve, i.e., $y=a+b*x+c*x**2+d*x**3+e*x**4$, results in an overall accuracy of 0.1%. The maximum design rope tension for a large electric shovel is 2 million pounds. At 1% accuracy, this results in an ideal resolution of +/−10 tons, and at 0.1% an ideal resolution of +/−1 Ton. FIG. 6 is an actual calibration curve for an x-axis bridge calibration loading applied clockwise 42 degrees from the y-axis of the sheave rod. Note the maximum calibration load is 1.05 million pounds.

The difficulty with such calibration data is that as the resultant load moved on the sheave rod, the change in output of the sheave rod was not linear. Along any calibration curve, the accuracy is 0.1%, but off the curve the accuracy fell to 1%. If we know the angle that the load is applied and this falls along one of the calibration curves, the sheave rod was very accurate.

Figure 7:
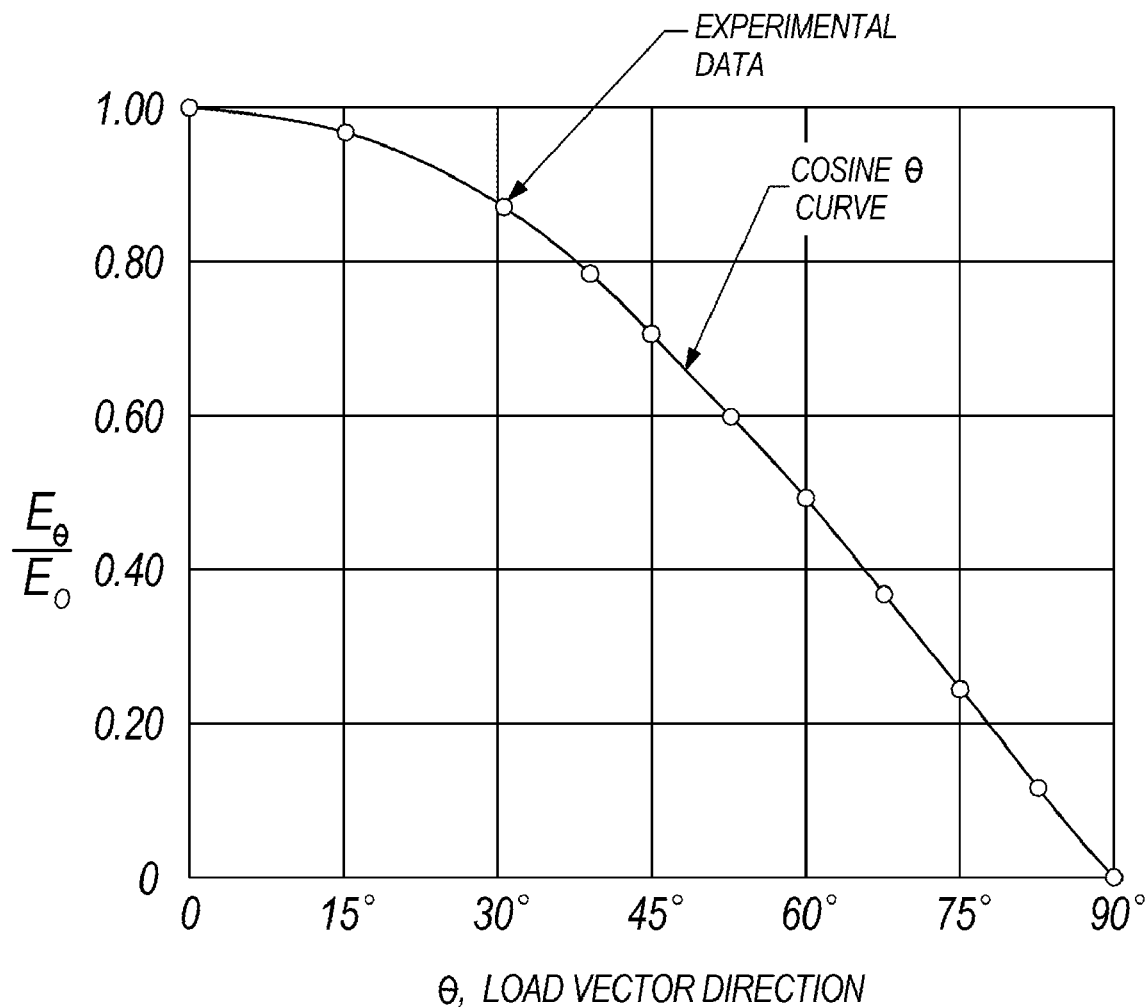
FIG. 7 is a graph of the calibration data showing how the data is not linear.

FIG. 7 shows a plot of the ratio of an inclined load to a vertical load, as a function of applied angle under ideal conditions. The Load Ratio (E) varies from 1 (vertical load) to 0 (horizontal load). The change in load is nonlinear from 0 to 45 degrees.

The mounted orientation of the sheave rod 38 on the power shovel 8 is chosen to insure that the resultant forces of the hoist rope on the sheave rod 38 were between 30 and 60 degrees for maximum sensitivity and linearity.

More particularly, the output of each strain gauge 40 in the sheave rod 38 in an operating shovel 8 is a millivolt (mV) signal from each of the X and Y bridges. The following procedure is then followed to obtain the resultant force and it angle of application.

From the x-axis bridge output, for each of the calibration curves for the x-axis, calculate the resultant force given the mV output. For example, assume the x-axis bridge output is 0.095 mV. At 34 degrees, this might result in a calculated resultant force of 200,000 lbs. At 36 degrees, 280,000 lbs., and so on. We now have 34 calculated resultant forces from each of the x-axis calibration curves.

From the y-axis bridge output, for each of the calibration curves for the y-axis, calculate the resultant force. For example, say the y-axis bridge output is 0.195 mV. At 34 degrees, this might result in a calculated resultant force of 800,000 lbs. At 36 degrees, 720,000 lbs., and so on. We now have 34 calculated resultant forces from each of the Y-axis calibration curves.

Plotting the above data then produces two curves, the output of y-bridge and the output of x-bridge as a function of applied load angle. The point where these two curves cross is our unknown resultant force (from the y-axis) and the resultant angle (from the x-axis).

Analytically, by fitting a fifth-order curve to each of these two data sets, and setting these two fifth-order equations equal to each other and solving for the real roots we obtain the angle at the point where the two curves cross. Substituting this angle into either of the two fifth-order equations then produces the Resultant force. The accuracy of the resultant force is within 0.1%. In other less preferred embodiments (not shown), a second, third or fourth order curve could be used.

Dipper Position

An accurate position of the dipper is needed to calculate the weight of soil in the dipper 22. A calibration procedure is performed at the beginning of operation of the shovel 8, with the dipper 22 in a known position. For example, the crowd arm 25 is extended until the hoist rope 23 is vertical, and raised until it is horizontal. These orientations are checked with suitable equipment. From this calibrated position, the crowd arm length and the hoist rope length are initialized to their respective known dimensions as determined from the shovel mechanical drawings. Recalibration is needed when any of the wire ropes on the shovel are replaced, or when other shovel conditions change, such as when the arm rack and pinion drive system skips a tooth.

More particularly, the resolvers are used to calculate the length of the hoist rope and the length of the crowd arm. From these lengths, the dipper position is found. Once the dipper position is known, as well as the hoist rope tension and the angle the hoist rope leaves the sheave rod, then the dipper weight can be calculated. Once such known approach to calculating the dipper weight is described in US Chang et al U.S. Pat. No. 6,225,574.

To calculate the hoist and crowd length, the following equation is used:
Length=offse+gain*resolver reading. The gain is known and constant for both the hoist and crowd resolver and has units of inches per count. Using the resolver reading from the hoist and crowd at initial calibration, one can use the above equation to solve for the calibration offset for hoist and crowd.

Unfortunately, electric shovel operators may forgo recalibration of the offset when shovel conditions change. And if this happens, then the dipper position is not accurate, and as a result any weight measurements are also inaccurate. Experience has shown that the hoist offset does not change very much, but the crowd length offset can. It is therefore useful to create a method of automating recalculating the crowd length offset as shovel conditions change. The following method can also be used to recalculate the hoist rope offset, if desired.

Using a microprocessor connected to the crowd length resolver, such as the one used in the above strain gauge reading mechanism, a) Keep track of the max crowd reading. From the length of crowd at max crowd extension, calculate the offset for the crowd.

b) From one dig cycle; obtain an array of readings from the crowd resolver.

c) At the same time, obtain an array of the calculated rope wrap angles from the analysis of the sheave rod strain gage data.

If a dig cycle has for example 400 data points, this would result in 400 calculated rope wrap angles from the resolver data and 400 wrap angles from the rod strain gauge outputs. If the calibration data was perfect, then each data point in the two curves would be equal. Data point 10 from the rod data would match the wrap angle calculated from data point 10 from the resolver calculation, for example.

d) Use the estimated values calculated in step a) above as a starting value. Then vary the crowd calibration offsets and calculate the expected wrap angle of the rope for the data collected in step a) for each variation, thus obtaining an array of readings from the crowd resolver to calculate an array of calculated rope wrap angles. Then, to get a new calibrated crowd resolver offset, use the crowd offset that produces the minimum amount of error between the two calculated sets of data. For example, sum the square of the difference between the calculated rope wrap angles from the resolver data and the calculated rope wrap angles from the sheave rod data, to find the crowd offset that produces the least amount of error. Still more particularly, use known nonlinear programming, such as nonlinear minimization to solve for n unknowns with m measurements, to determine the offset value that minimizes the difference between the calculated rope wrap angles from the resolver data and the calculated rope wrap angle from the other device for measuring the rope wrap angles.

Another method for calculating the crowd offset is to use the hoist rope length together with the rope angle calculated by the above strain gauge mechanism. With the known length of the boom between the dipper arm and the end of the boom (the hoist sheaves), the length of the hoist rope between the end of the boom and the dipper, and the hoist rope wrap angle, the length of the dipper arm can be calculated using basic geometry. Once the dipper arm length is known, the crowd offset can be determined.

Various other features and advantages of the invention will be apparent from the following claims.

The invention claimed is:

1. A digging machine capable of raising and lowering a load, the machine comprising:
   a platform;
   a boom attached at a first boom end to the platform;
   a rod mounted transverse to a longitudinal axis of the boom on a second boom end of the boom, the rod including a central bore with at least two strain gauges mounted therein and angled relative to each other;
   a hoist rope extending over the rod and having an end adapted to be attached to the load; and
   a central processing unit including a software and a memory, the central processing unit connected to the at least two strain gauges and configured to:
   create a calibration table of a plurality of outputs from each of said at least two strain gauges, given various rope tensions and rope angles,
   determine an unknown rope tension and rope angle,
   use the output from one strain gauge and create a first set of data point angle and tension pairs from said plurality of calibration outputs that correspond to said one output from said one strain gauge,
   use the output from the other strain gauge and create a second set of data point angle and tension pairs from said plurality of calibration outputs that correspond to said one output from said other strain gauge, and
   determine, based on where said two sets of data points intersect, rope tension and rope angle.

2. (The digging machine of claim 1, wherein said strain gauges are perpendicular to each other.

3. The digging machine of claim 1, wherein a curve is fitted to said created strain gauge outputs for a given rope angle or rope tension.

4. The digging machine of claim 3, wherein said curve is a fifth order curve.

5. The digging machine of claim 3, wherein said sets of data point angle and tension pairs is created from said curve fitted to said created strain gauge outputs.

6. The digging machine of claim 1, wherein a curve is fitted to each of said sets of data point angle and tension pairs.

7. The digging machine of claim 1, wherein said curve is a fifth order curve.

8. The digging machine of claim 1, wherein the rope angle is the angle of departure of the hoist rope from the rod, and the rope tension is a force of the load on the hoist rope.

* * * * *

UNITED STATES PATENT AND TRADEMARK OFFICE
CERTIFICATE OF CORRECTION

PATENT NO. : 8,370,031 B2  
APPLICATION NO. : 13/471985  
DATED : February 5, 2013  
INVENTOR(S) : Richard L. Claxton It is certified that error appears in the above-identified patent and that said Letters Patent is hereby corrected as shown below:

In the Claims

Column 8, Line 31 of Claim 2: Delete "("

Signed and Sealed this  
Twenty-eighth Day of May, 2013

Teresa Stanek Rea  
*Acting Director of the United States Patent and Trademark Office*